(12) United States Patent
Tatsuma et al.

(10) Patent No.: US 9,616,845 B2
(45) Date of Patent: Apr. 11, 2017

(54) WEBBING TAKE-UP DEVICE

(71) Applicant: KABUSHIKI KAISHA TOKAI-RIKA-DENKI-SEISAKUSHO, Aichi-Ken (JP)

(72) Inventors: Atsushi Tatsuma, Aichi-ken (JP); Takuhiro Saito, Aichi-ken (JP); Yoshimichi Kaneko, Aichi-ken (JP); Yuya Nagata, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 138 days.

(21) Appl. No.: 14/638,453

(22) Filed: Mar. 4, 2015

(65) Prior Publication Data

US 2015/0251629 A1    Sep. 10, 2015

(30) Foreign Application Priority Data

Mar. 7, 2014   (JP) ................................ 2014-045386

(51) Int. Cl.
*B60R 22/46*   (2006.01)

(52) U.S. Cl.
CPC ........ *B60R 22/46* (2013.01); *B60R 2022/468* (2013.01); *B60R 2022/4666* (2013.01)

(58) Field of Classification Search
CPC .......................... B60R 22/46; B60R 2022/468
See application file for complete search history.

(56) References Cited

U.S. PATENT DOCUMENTS

| 8,376,258 B2 * | 2/2013 | Ando | B60R 22/46 242/374 |
| 2010/0264245 A1 * | 10/2010 | Ando | B60R 22/46 242/390 |
| 2015/0251628 A1 * | 9/2015 | Tatsuma | B60R 22/46 242/394.1 |

FOREIGN PATENT DOCUMENTS

JP    2011088469 A    5/2011

* cited by examiner

*Primary Examiner* — Sang Kim
(74) *Attorney, Agent, or Firm* — Roberts Mlotkowski Safran Cole & Calderon P.C.

(57) ABSTRACT

A webbing take-up device is obtained capable of suppressing slight axial direction movement of a gear configuring a mechanism to release overload. A large gear portion of a two-step gear configuring an overload release mechanism of the webbing take-up device is sandwiched between a small gear portion end face of a small gear portion and a bottom portion of a rotor. This thereby enables rattling which is slight axial direction movement of the large gear portion to be suppressed.

4 Claims, 5 Drawing Sheets

WEBBING TAKE-UP DEVICE

CROSS-REFERENCE TO RELATED APPLICATION

This application claims priority under 35 USC 119 from Japanese Patent Application No. 2014-045386 filed Mar. 7, 2014, the disclosure of which is incorporated by reference herein.

BACKGROUND

Field of the Invention

The present invention relates to a webbing take-up device capable of cutting off transmission of rotation force between a motor and a spool in a case in which the webbing is pulled in a driven state of the motor.

Related Art

In a mechanism for releasing overload of a webbing take-up device, a small diameter gear and a large diameter gear are respectively supported on a support shaft of a clutch housing. The large diameter gear may move slightly in the axial direction with respect to the small diameter gear (see for example Japanese Patent Application Laid-Open (JP-A) No. 2011-88469).

SUMMARY

In consideration of the above circumstances, a webbing take-up device capable of suppressing slight movement of a gear in an axial direction configuring a mechanism for releasing overload is obtained.

A webbing take-up device of a first aspect includes: a spool on which webbing is taken up; a motor that rotates the spool; a first gear that is provided on a rotation transmission route from the motor to the spool; a second gear that is provided on the rotation transmission route and that is capable of relative rotation with respect to the first gear; a retaining member that is assembled coaxially to the second gear so as to be incapable of relative rotation with respect to the second gear, the first gear being sandwiched by the retaining member and the second gear; a restriction portion that restricts movement of the retaining member away from the second gear in an axial direction; and a clutch member that is attached to the retaining member and transmits rotation between the first gear and the second gear by frictional engagement with the retaining member, and that cuts off transmission of the rotation by the clutch member rotating relative to the retaining member.

According to the webbing take-up device of the first aspect, the first gear is sandwiched between the second gear and the retaining member in the axial direction of the second gear. The restriction portion is formed at either the second gear or the retaining member, and the restriction portion restricts movement of the retaining member away with respect to the second gear in the axial direction of the second gear. This thereby enables slight movement of the first gear with respect to the second gear in the axial direction of the second gear to be suppressed.

A webbing take-up device of a second aspect is the webbing take-up device of the first aspect, wherein the retaining member includes: a circular cylinder portion that is formed in a circular cylinder shape coaxial with the second gear, and at whose outer peripheral portion the clutch member is mounted; and a bottom portion that closes off one end of the circular cylinder portion and through which the second gear passes.

According to the webbing take-up device of the second aspect, the retaining member can be formed in the simple shape of a bottomed circular cylinder shape, with the one end of the circular cylinder portion being closed off by the bottom portion.

A webbing take-up device of a third aspect is the webbing take-up device of either the first aspect or the second aspect, further including: a shaft portion that is formed at one of the second gear or the retaining member, that rotatably supports the first gear, and whose end face abuts another of the second gear or the retaining member so as to restrict approaching of the second gear and the retaining member toward each other.

According to the webbing take-up device of the third aspect, the first gear is rotatably supported by the shaft portion formed at either the second gear or the retaining member. The another of the second gear or the retaining member abuts the end face of the shaft portion, restricting approaching (movement) of the second gear and the retaining member toward each other. This thereby enables the second gear and the retaining member to be suppressed from pressing on the first gear, enabling smooth rotation of the first gear about the shaft portion.

A webbing take-up device of a fourth aspect is the webbing take-up device of the third aspect, further including a rotation stopper that is formed projecting out from an end portion of the shaft portion, that has a smaller external profile than an external profile of the shaft portion, that passes through and supports the another of the second gear or the retaining member, and that prevents relative rotation of the retaining member with respect to the second gear.

According to the webbing take-up device of the fourth aspect, the rotation stopper that prevents relative rotation of the retaining member with respect to the second gear is formed projecting out from the end portion of the shaft portion. The external profile of the rotation stopper is formed smaller than the external profile of the shaft portion. The another of the second gear or the retaining member is abutted with the end face of the shaft portion in a state in which the another of the second gear or the retaining member is supported by the rotation stopper, due thereto, movement of the second gear and the retaining member toward each other can be restricted.

A webbing take-up device of a fifth aspect is the webbing take-up device of the fourth aspect, wherein the restriction portion is formed at the rotation stopper on an opposite side from the shaft portion, and the another of the second gear or the retaining member is fixed to the rotation stopper by the restriction portion.

According to the webbing take-up device of the fifth aspect, the restriction portion formed at the rotation stopper on the opposite side to the shaft portion can fix the another of the second gear or the retaining member to the rotation stopper.

As described above, the webbing take-up device according to the aspects is capable of suppressing slight axial direction movement of the first gear, configuring a mechanism to release overload, in the axial direction of the second gear.

BRIEF DESCRIPTION OF THE DRAWINGS

Exemplary embodiment will be described in detail with reference to the following figures, wherein.

DETAILED DESCRIPTION

Configuration of Present Exemplary Embodiment

Explanation follows regarding a webbing take-up device 10 according to an exemplary embodiment, with reference to FIG. 1 to FIG. 4. In each of the drawings, the arrow FR indicates the front side in the front-rear direction of the webbing take-up device 10, the arrow LH indicates the left side in the left-right direction of the webbing take-up device 10, and the arrow UP indicates the upper side in the up-down direction of the webbing take-up device 10.

Overall Configuration of Webbing Take-Up Device 10

Figure 1:
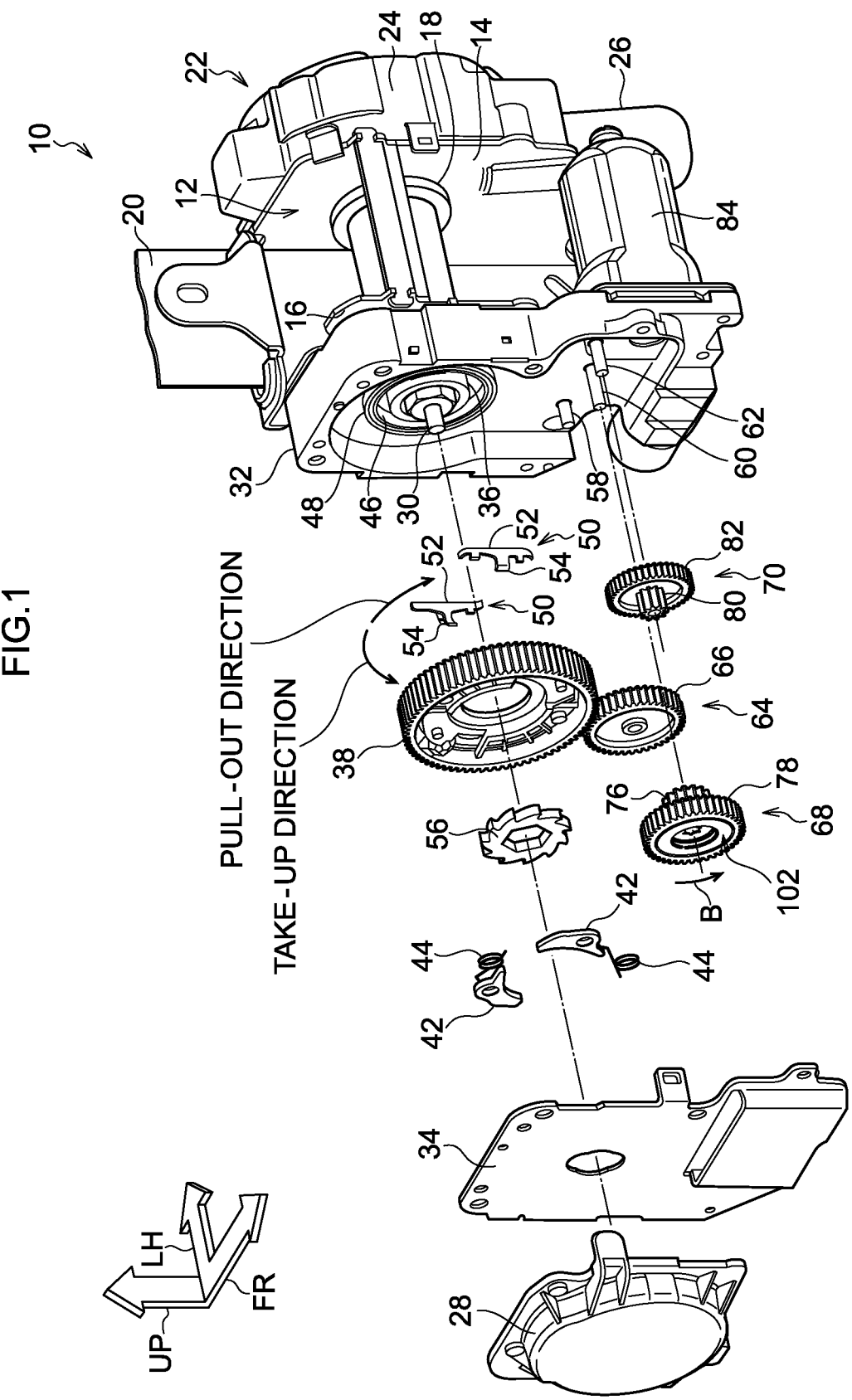
FIG. 1 is an exploded perspective view showing a webbing take-up device according to an exemplary embodiment.

As shown in FIG. 1, the webbing take-up device 10 is, for example, provided with a frame 12 fixed to a vehicle body configuration member, such as a vehicle framework member or reinforcement member. The frame 12 is provided with leg plates 14 and 16 facing each other in the left-right direction, and a spool 18 is provided between the leg plates 14 and 16. The spool 18 is formed in a substantially circular cylinder shape, with the axial direction running in the direction along which the leg plates 14 and 16 face each other. A base end side in a length direction of a webbing 20, worn by an occupant, is anchored (caught) to the spool 18. The spool 18 is capable of rotating about its center axial line in a take-up direction and a pull-out direction which is opposite to the take-up direction. The webbing 20 is taken up in a layered shape on an outer peripheral portion of the spool 18 by rotation of the spool 18 in the take-up direction.

A housing 24 for a lock mechanism 22 is attached to the leg plate 14. One end of the spool 18 is rotatably supported by the housing 24. Various components, configuring a VSIR mechanism and a WSIR mechanism, are provided inside the housing 24. The VSIR mechanism is actuated in a state of sudden vehicle deceleration in the event of a vehicle collision. The WSIR mechanism is actuated by pull-out direction rotation of the spool 18 accelerating in excess of a specific magnitude. Actuation of the VSIR mechanism or the WSIR mechanism actuates a lock member (not shown in the drawings) configuring the lock mechanism 22, preventing rotation of the spool 18 in the pull-out direction.

The spool 18 is further provided with a force limiter mechanism. In a state in which rotation of the spool 18 in the pull-out direction is prevented by the lock member of the lock mechanism, the spool 18 rotates in the pull-out direction while deforming an energy absorption member of the force limiter mechanism when the rotational force of the spool 18 in the pull-out direction exceeds a specific magnitude. The webbing 20 is pulled out from the spool 18 by the rotation amount of the spool 18 in the pull-out direction, and a portion of the rotational force of the spool 18 is expended and absorbed by the deformation of the energy absorption member. A pretensioner 26 is provided to a lateral side of the leg plate 14. The pretensioner 26 actuates in a vehicle emergency to forcibly rotate the spool 18 in the take-up direction.

A spring housing 28 is provided outside the leg plate 16. A leading end side of a shaft member 30 passes through the leg plate 16 and enters inside the spring housing 28, and the shaft member 30 is rotatably supported by the spring housing 28. The shaft member 30 is provided coaxially to the spool 18, and is coupled to the spool 18 to prevent relative rotation with respect to the spool 18. A spiral spring (not shown in the drawings) is provided inside the spring housing 28, and the shaft member 30 is urged in the take-up direction by the spiral spring. A gear housing 32 is provided between the leg plate 16 and the spring housing 28. The gear housing 32 is formed in a recessed shape open toward the right side, and the open side of the gear housing 32 is closed off by a plate 34 provided between the spring housing 28 and the gear housing 32.

A ratchet wheel 56 is provided inside the gear housing 32. The ratchet wheel 56 is provided coaxially to the shaft member 30, and is prevented from rotating relative to the shaft member 30. A circular cylinder shaped support portion 36 is formed inside the gear housing 32. The support portion 36 is formed coaxially to the spool 18, and is penetrated by the shaft member 30. A clutch gear 38 is rotatably supported by the support portion 36. Pawls 42 are turnably provided inside the clutch gear 38. Return springs 44 are also provided inside the clutch gear 38, urging the pawls 42 such that leading end sides of the pawls 42 turn toward the radial direction outside of the clutch gear 38.

Retaining rings 46 and 48 are formed at the outside of the support portion 36. The retaining rings 46 and 48 are formed coaxially to the support portion 36, and the retaining ring 48 is formed at the outside of the retaining ring 46. Base portions 52 of abut members 50 intrude between the retaining rings 46 and 48. The base portion 52 of each abut member 50 makes sliding contact with an outside face of the retaining ring 46 and an inside face of the retaining ring 48, and the abut members 50 are capable of rotating about the support portion 36 guided by the retaining rings 46 and 48.

An abut portion 54 extends from the base portion 52 of each abut member 50 toward the right side, and the abut portion 54 faces the leading end side of the pawl 42 on the side further toward the take-up direction side from the pawl 42. When the clutch gear 38 rotates in the take-up direction, the leading end side of the pawl 42 comes into contact (abuts) with the abut portion 54 of the abut member 50. When the clutch gear 38 rotates in the take-up direction in this state, the pawl 42 is turned against the urging force of the return spring 44, such that the leading end side of the pawl 42 enmeshes with the ratchet wheel 56. When the clutch gear 38 rotates further in the take-up direction in this state, the abut member 50 is pressed by the pawl 42, and the abut member 50 rotates about the support portion 36 together with the clutch gear 38.

Three shafts 58, 60, 62 are formed to the gear housing 32, and a gear 66, a two-step (two-stage) gear 68, and a two-step (two-stage) gear 70 configuring a reduction gear train 64 are rotatably supported on the shafts 58 to 62. The gear 66 enmeshes with the clutch gear 38 and a small gear portion 76 of the two-step gear 68, and a large gear portion 78 of the two-step gear 68 enmeshes with a small gear portion 80 of the two-step gear 70.

A motor 84 is provided at a lower side of the spool 18 between the leg plates 14 and 16. The motor 84 is electrically connected to an ECU (not shown in the drawings) serving as a control unit, and is further electrically connected to a vehicle-mounted battery (not shown in the drawings) through the ECU. The ECU is electrically connected to a forward observation device (not shown in the drawings) that measures a distance from the vehicle installed with the webbing take-up device 10 to another vehicle and/or obstacle located ahead from the vehicle. The ECU drives the motor 84 with forward rotation when the distance is below a specific value.

An output shaft (not shown in the drawings) of the motor 84 passes through the leg plate 16 and the gear housing 32, and a leading end of the output shaft of the motor 84 is provided with a pinion gear (not shown in the drawings) that enmeshes with the a large gear portion 82 of the two-step gear 70. The pinion gear of the output shaft of the motor 84, the two-step gear 70, the two-step gear 68, the gear 66, and the clutch gear 38 configure a rotation transmission route from the motor 84 to the spool 18, and forward rotation drive force of the motor 84 is reduced in speed by the reduction gear train 64 and transmitted to the clutch gear 38, thereby rotating the clutch gear 38 in the take-up direction.

Overload Release Mechanism Configuration

Figure 2A:
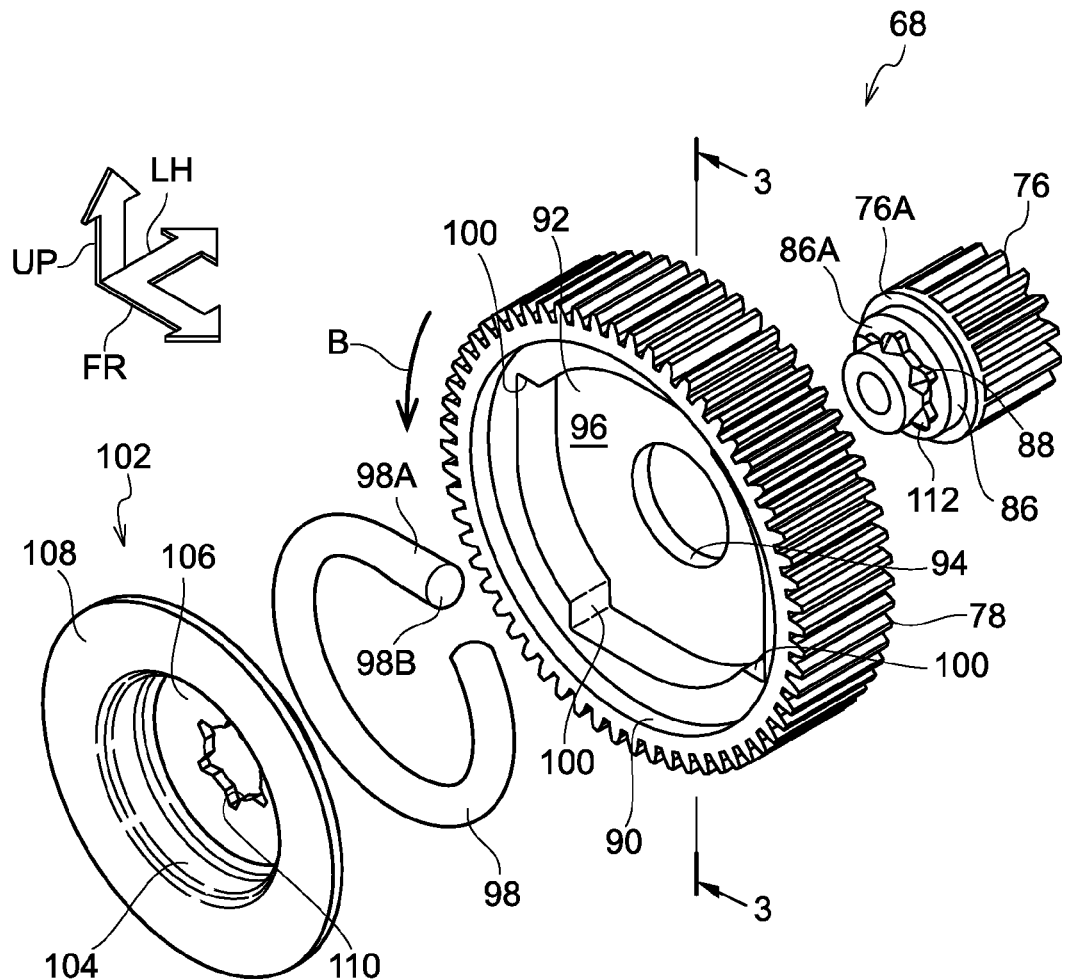
FIG. 2A is an exploded perspective view showing a first gear, a second gear, a retaining member, and a clutch member.
Figure 2B:
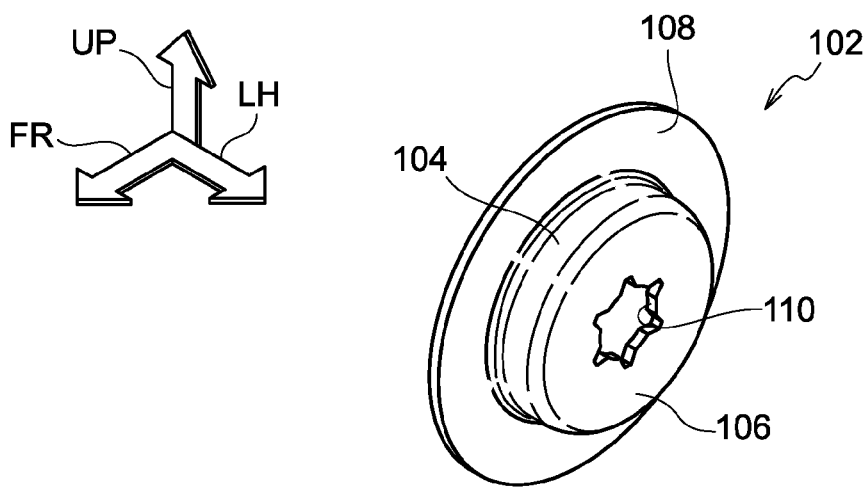
FIG. 2B is a perspective view showing the retaining member from the opposite side to FIG. 2A.

The two-step gear 68 of the reduction gear train 64 configures an overload release mechanism. As shown in FIG. 2, a shaft portion 86 is formed projecting out from a small gear portion end face 76A on the right side of the small gear portion 76, serving as a second gear of the two-step gear 68. The shaft portion 86 is formed coaxially to the small gear portion 76, with a smaller external profile than that of the small gear portion 76. A rotation stopper 88 is formed projecting out from a shaft portion end face 86A on the right side of the shaft portion 86. The external profile of the rotation stopper 88 is smaller than that of the shaft portion 86 and is formed in a non-circular shape such as a spline shape. The small gear portion 76, the shaft portion 86, and the rotation stopper 88 thus form a stepped shape with an external profile (external profile seen from the axial direction) becoming smaller on progression toward the side of the rotation stopper 88.

The large gear portion 78, serving as a first gear of the two-step gear 68, is formed at the outer periphery of a tube shaped portion 90. A circular plate shaped intermediate bottom portion 92 is formed at an intermediate portion in an axial direction of the large gear portion 78, and a circular hole 94 is formed at an axial center portion of the intermediate bottom portion 92. The shaft portion 86 of the small gear portion 76 passes through the circular hole 94, and the intermediate bottom portion 92 abuts the small gear portion end face 76A, such that the large gear portion 78 is supported capable of relative rotation with respect to the small gear portion 76.

A recess shaped accommodation portion 96 is formed at the right side of the intermediate bottom portion 92. A clutch spring 98, serving as a clutch member, is provided inside the accommodation portion 96. The clutch spring 98 is formed by bending an (central) axial line of a metal bar (rod) material, which has spring properties and which has a circular cross-section profile, into a circular shape, to form a substantially C-shape whose circumference length from circumference one end to circumference another end is shorter than a full circumference length around the circumferential direction and in which between the circumference one end and the circumference another end are non-continuous. One end side of the clutch spring 98 configures a straight portion 98A extending in a straight line shape in a direction tangential to the circular shaped axial line of the clutch spring 98. Opposing (facing) portions 100 are formed to the accommodation portion 96 corresponding to one end face 98B of the straight portion 98A of the clutch spring 98. The opposing portions 100 are formed every specific angle (90 degrees in the present exemplary embodiment) about the axial center of the large gear portion 78. In an accommodated state of the clutch spring 98 in the accommodation portion 96, one of the opposing portions 100 is capable of abutting the one end face 98B of the clutch spring 98.

The two-step gear 68 is provided with a rotor 102 serving as a retaining member. The rotor 102 is provided with a circular cylinder portion 104. A left side end portion of the circular cylinder portion 104 is closed off by a bottom portion 106, and a flange 108 extends out from a right side end portion of the circular cylinder portion 104 toward the radial direction outside of the rotor 102. The overall rotor 102 is thus formed with a hat profile that is an example or an aspect of a bottomed circular cylinder shape as a whole, and is formed by press forming a flat metal plate. A hole 110 is formed in the bottom portion 106 of the rotor 102. The shape of the hole 110 is formed with the same shape as that of the rotation stopper 88 of the small gear portion 76. The rotation stopper 88 passes through the hole 110, thereby preventing rotation of the rotor 102 relative to the small gear portion 76.

Figure 3:
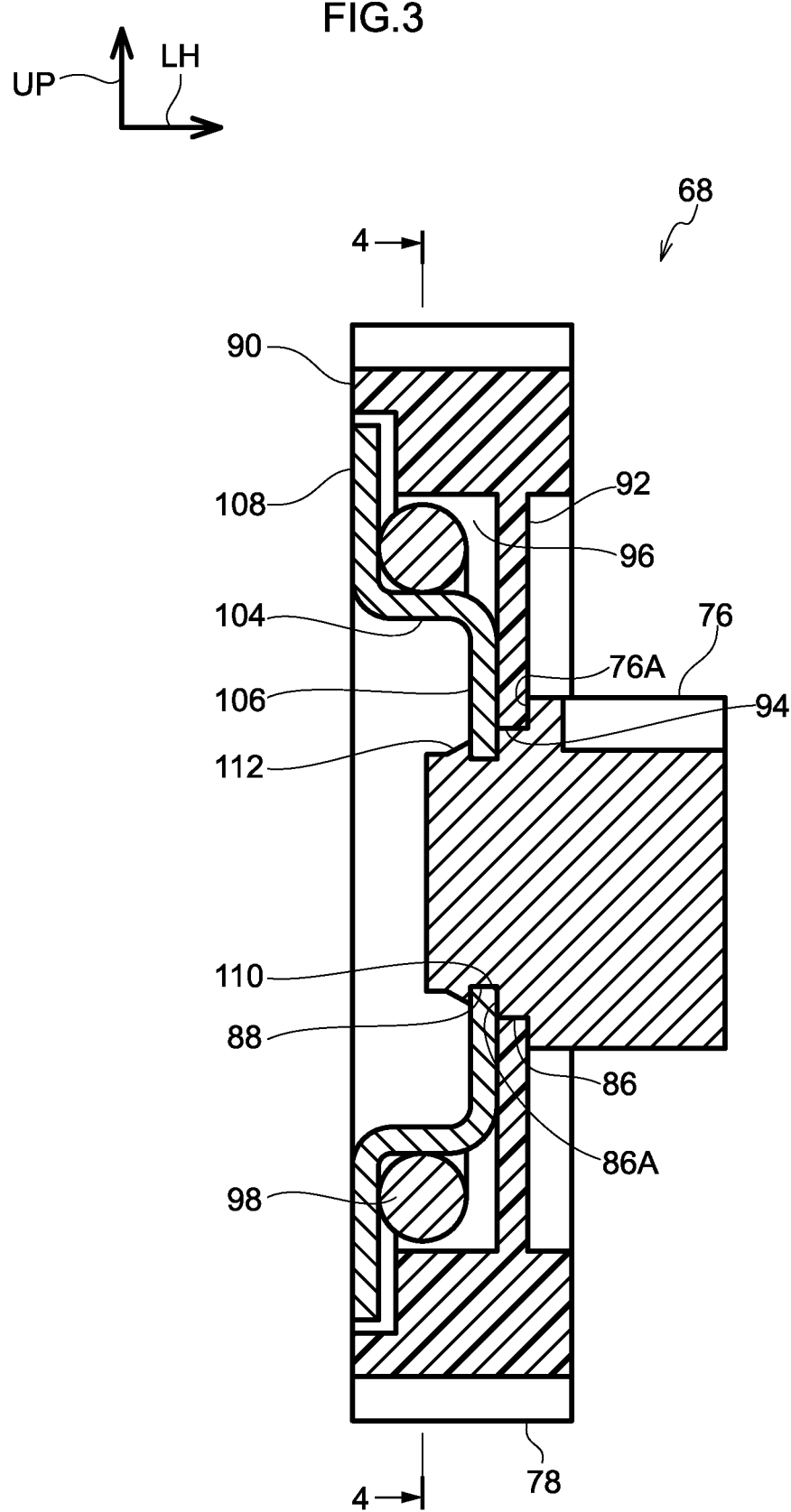
FIG. 3 is a cross-section corresponding to line 3-3 in FIG. 2A, and shows the first gear and related components assembled thereto.
Figure 4:
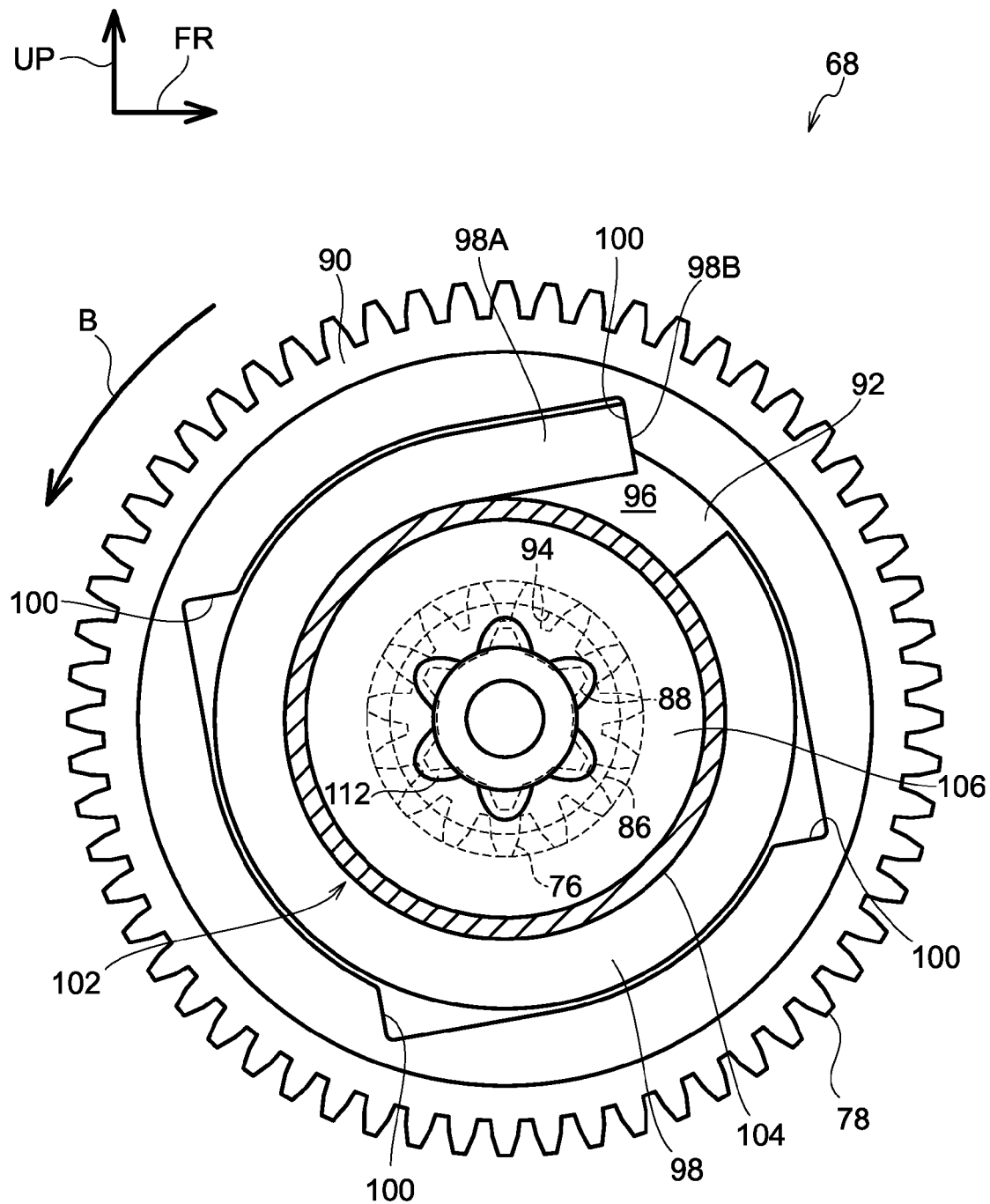
FIG. 4 is a cross-section taken along line 4-4 in FIG. 3.

In an abut state between the bottom portion 106 of the rotor 102 and the shaft portion end face 86A of the shaft portion 86, the leading end side of the rotation stopper 88 passes through the hole 110 and projects out toward the right side of the bottom portion 106. As shown in FIG. 3, the leading end side of the rotation stopper 88 is formed with a caulk portion 112. The caulk portion 112 is formed by pressing and caulking the rotation stopper 88 from the leading end. The external profile of the caulk portion 112 is larger than that of the hole 110, thereby preventing movement of the rotor 102 toward the right side. In this state, the intermediate bottom portion 92 of the large gear portion 78 is interposed (sandwiched) between the bottom portion 106 of the rotor 102 and the small gear portion 76, thereby restricting movement of the large gear portion 78 along the axial direction of the two-step gear 68 with respect to the small gear portion 76.

More specifically, an axial direction dimension of the shaft portion 86 between the small gear portion end face 76A of the small gear portion 76 and the shaft portion end face 86A of the shaft portion 86 is set substantially same as (the same as, or slightly larger than) the thickness (wall thickness) of the intermediate bottom portion 92 of the large gear portion 78. The intermediate bottom portion 92 is therefore not strongly pressed to the bottom portion 106 of the rotor 102 or the small gear portion end face 76A of the small gear portion 76, even when the intermediate bottom portion 92 being interposed between the bottom portion 106 and the small gear portion end face 76A. This enables free relative rotation of the large gear portion 78 between the small gear portion 76 and the rotor 102. In this state, the accommodation portion 96 of the large gear portion 78, in which the clutch spring 98 is provided, is closed off by the flange 108 of the rotor 102.

The clutch spring 98 is attached to the circular cylinder portion 104 of the rotor 102 so as to be wound resiliently thereon, the clutch spring 98 pressing and contacting on the outside face of the circular cylinder portion 104. The clutch spring 98 and the rotor 102 rotate together integrally (as a unit) due to friction between the clutch spring 98 and the circular cylinder portion 104.

Operation and Advantageous Effects of the Present Exemplary Embodiment

Explanation follows regarding operation and advantageous effects of the present exemplary embodiment.

In the webbing take-up device 10, the distance from the vehicle installed with the webbing take-up device 10 to another vehicle and/or obstacle located ahead from the vehicle is measured by the forward observation device, and when the distance is below the specific value, the ECU drives the motor 84 for forward rotation. The forward rotation drive force of the motor 84 is transmitted to the large gear portion 78 of the two-step gear 68 through the pinion gear of the output shaft of the motor 84 and the two-step gear 70. The large gear portion 78 accordingly rotates in the direction of arrow B in FIG. 4. When, due to the rotation of the large gear portion 78, the one end face 98B of the clutch spring 98 is pressed by one opposing portion 100 of the large gear portion 78, the rotor 102 rotates together with the clutch spring 98. Due thereto, when the small gear portion 76 of the two-step gear 68 is rotated, the rotation of the small gear portion 76 is transmitted through the gear 66 to the clutch gear 38, and the clutch gear 38 rotates in the take-up direction.

Due thereto, when the pawls 42 of the clutch gear 38 abut the abut portions 54 of the abut members 50, the pawl 42 turns due to a pressing reaction force from the abut portion 54, and the leading end side of the pawl 42 enmeshes with the ratchet wheel 56. Due thereto, the rotation of the clutch gear 38 is transmitted through the ratchet wheel 56 and the shaft member 30 to the spool 18, and the spool 18 is rotated in the take-up direction. The webbing 20 mounted over the body of the occupant is thereby taken up onto the spool 18, removing slackness of the webbing 20.

When, for example, the vehicle slows down (decelerates), the body of the occupant attempts to moves toward the vehicle front side under inertia, and the webbing 20 is pulled by the body of the occupant. If the motor 84 is being driven for forward rotation in this state, rotation force which is in the opposite direction to the drive force of the motor 84 is transmitted from the spool 18 toward the motor 84 side. Due thereto, when a pressing force applied from the one end face 98B of the clutch spring 98 to the opposing portion 100 of the large gear portion 78 of the two-step gear 68 exceeds a sliding (slipping) torque (maximum frictional force) between the clutch spring 98 and the circular cylinder portion 104 of the rotor 102, the diameter of the clutch spring 98 is caused to be enlarged so the clutch spring 98 slides (slips) against the circular cylinder portion 104 of the rotor 102. This enables a reduction in the load applied to the respective enmeshing portions of the clutch gear 38, the respective gears 66, 68, 80 of the reduction gear train 64, and the pinion gear of the output shaft of the motor 84.

Note that the large gear portion 78 of the two-step gear 68 is interposed (sandwiched) between the small gear portion 76 and the bottom portion 106 of the rotor 102, so, movement of the large gear portion 78 with respect to the small gear portion 76 in the axial direction of the two-step gear 68 is restricted so as to be reduced or eliminated. Rattling, namely slight movement of the large gear portion 78 in the axial direction of the two-step gear 68, can be suppressed, enabling rattling to be reduced or eliminated. This thereby enables enmeshing of the large gear portion 78 with the small gear portion 80 of the two-step gear 70 to be stabilized, enabling stabilization of the transmission performance of drive force from the motor 84 to the spool 18.

The rotor 102, to which the clutch spring 98 is mounted, enables rattling of the large gear portion 78 to the opposite side to the small gear portion 76 to be suppressed. A dedicated component that only suppresses rattling of the large gear portion 78 is therefore unnecessary, enabling an increase in the number of components to be suppressed.

Since the external profile of the rotation stopper 88 is smaller than that of the shaft portion 86, movement of the rotor 102 toward the shaft portion 86 side is prevented by abutting between the bottom portion 106 of the rotor 102 and the shaft portion end face 86A of the shaft portion 86. The small gear portion end face 76A of the small gear portion 76 and the bottom portion 106 of the rotor 102 can accordingly be prevented from pressingly contacting against the intermediate bottom portion 92 of the large gear portion 78. This thereby enables smooth rotation of the large gear portion 78 about the shaft portion 86 when sliding (slipping) is generated between the clutch spring 98 and the circular cylinder portion 104 of the rotor 102.

Movement of the rotor 102 toward the opposite side to the small gear portion 76 is prevented or restricted by the caulk portion 112. Note that the caulk portion 112 is formed by pressing and caulking the leading end of the rotation stopper 88 passing through the bottom portion 106 of the rotor 102 in the axial direction of the two-step gear 68. The pressing direction for forming the caulk portion 112 is thus the same as the assembly direction of the rotor 102 and the large gear portion 78 to the small gear portion 76. This thereby enables single direction assembly of the two-step gear 68, facilitating assembling of the two-step gear 68, and moreover enables assembling of the two-step gear 68 to be automated.

In a state prior to forming the caulk portion 112, the external profile of the shaft portion 86 is smaller than that of the small gear portion 76, and the external profile of the rotation stopper 88 is smaller than that of the shaft portion 86. Accordingly, no undercut is formed when the small gear portion 76, the shaft portion 86, and the rotation stopper 88 are integrally formed by forging or the like. This thereby enables simple integrally forming of the small gear portion 76, the shaft portion 86, and the rotation stopper 88.

The rotor 102 is configured as a separate member to the small gear portion 76. Accordingly, even when there is a change in the external diameter dimension of the circular cylinder portion 104 of the rotor 102 due to a change in the specification of the clutch spring 98, such specification change can accordingly be coped with by simply exchanging the rotor 102. Costs accompanying specification change can accordingly be kept low. Moreover, the rotor 102 can be formed at low cost, since the rotor 102 can be formed by press forming a flat metal plate, and since the rotor 102 has a simple shape in which the circular flange 108 extends from the open end of the circular cylinder portion 104.

Note that in the present exemplary embodiment, in the two-step gear 68, the large gear portion 78 that is input with drive force from the motor 84 configures the first gear, and the small gear portion 76 that outputs rotation force to the spool 18 side configures the second gear. However, configuration may be made in which the second gear is input with drive force from the motor, and the first gear outputs rotation force to the spool.

In the present exemplary embodiment, the large gear portion 78 configuring the first gear is configured larger and with more teeth than the small gear portion 76 configuring the second gear. However, the second gear may be configured larger and with more teeth than the first gear, and there is no limitation to the sizes or numbers of teeth of the first gear and the second gear.

Figure 5:
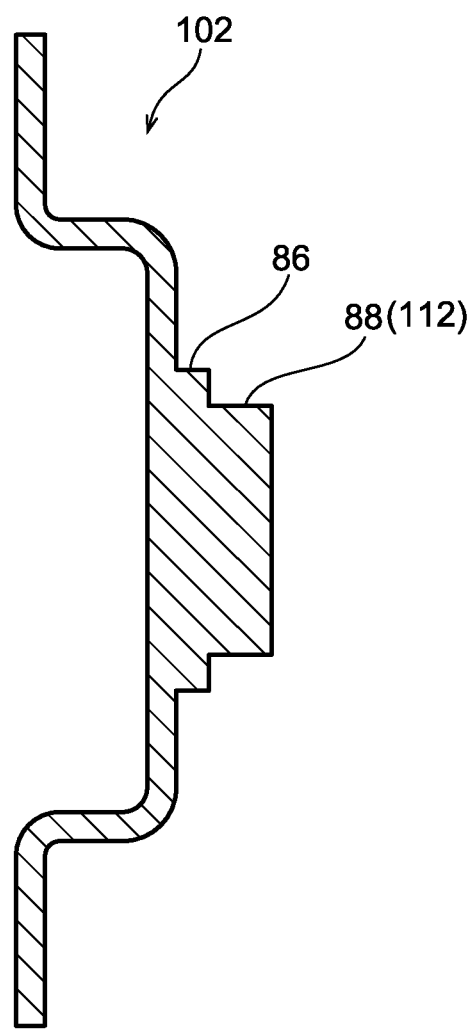
FIG. 5 is a cross-section view showing a webbing take-up device according to a modified exemplary embodiment.

In the present exemplary embodiment, at the small gear portion 76 configuring the second gear, the shaft portion 86 and the caulk portion 112 that configures a restriction portion are formed. However, the shaft portion and restriction portion may be formed to the retaining member (FIG. 5).

What is claimed is:

1. A webbing take-up device comprising:
a spool on which webbing is taken up;
a motor that rotates the spool;
a first gear that is provided on a rotation transmission route from the motor to the spool;
a second gear that is provided on the rotation transmission route and that is capable of relative rotation with respect to the first gear;
a retaining member that is assembled coaxially to the second gear so as to be incapable of relative rotation with respect to the second gear, the first gear being sandwiched by the retaining member and the second gear;
a restriction portion that is provided at one of the second gear or the retaining member, and that restricts movement of the retaining member away from the second gear in an axial direction;
a clutch member that is retained at the retaining member and transmits rotation between the first gear and the second gear by frictional engagement with the retaining member, and that cuts off transmission of the rotation by the clutch member rotating relative to the retaining member;
a shaft portion that is formed at one of the second gear or the retaining member, that rotatably supports the first gear, an end face of the shaft portion abutting another of the second gear or the retaining member so as to restrict the second gear and the retaining member from approaching toward each other, and
a rotation stopper that is formed projecting out from an end portion of the shaft portion, that has a smaller external profile than an external profile of the shaft portion, that passes through and supports the another of the second gear or the retaining member, and that prevents relative rotation of the retaining member with respect to the second gear,
wherein the retaining member includes:
a circular cylinder portion that is formed in a circular cylinder shape coaxial with the second gear, the clutch member being mounted at an outer peripheral portion of the circular cylinder portion; and
a bottom portion that closes off one end of the circular cylinder portion and through which the second gear passes.

2. The webbing take-up device of claim 1, wherein:
the restriction portion is formed at the rotation stopper on an opposite side from the shaft portion, and the another of the second gear or the retaining member is fixed to the rotation stopper by the restriction portion.

3. A webbing take-up device comprising:
a spool on which webbing is taken up;
a motor that rotates the spool;
a first gear that is provided on a rotation transmission route from the motor to the spool;
a second gear that is provided on the rotation transmission route and that is capable of relative rotation with respect to the first gear;
a retaining member that is assembled coaxially to the second gear so as to be incapable of relative rotation with respect to the second gear, the first gear being sandwiched by the retaining member and the second gear;
a restriction portion that is provided at one of the second gear or the retaining member, and that restricts movement of the retaining member away from the second gear in an axial direction;
a clutch member that is retained at the retaining member and transmits rotation between the first gear and the second gear by frictional engagement with the retaining member, and that cuts off transmission of the rotation by the clutch member rotating relative to the retaining member;
a shaft portion that is formed at one of the second gear or the retaining member, that rotatably supports the first gear, an end face of the shaft portion abutting another of the second gear or the retaining member so as to restrict the second gear and the retaining member from approaching toward each other, and
a rotation stopper that is formed projecting out from an end portion of the shaft portion, that has a smaller external profile than an external profile of the shaft portion, that passes through and supports the another of the second gear or the retaining member, and that prevents relative rotation of the retaining member with respect to the second gear.

4. The webbing take-up device of claim 3, wherein:
the restriction portion is formed at the rotation stopper on an opposite side from the shaft portion, and the another of the second gear or the retaining member is fixed to the rotation stopper by the restriction portion.

* * * * *